United States Patent
Chau

(10) Patent No.: US 6,447,678 B2
(45) Date of Patent: Sep. 10, 2002

(54) REGENERATION OF WATER TREATMENT MEDIA

(76) Inventor: Yiu Chau Chau, 80 W. Beaver Creek Road, Unit 14, Richmond Hill, Ontario (CA), L4B 1H3

( * ) Notice: Subject to any disclaimer, the term of this patent is extended or adjusted under 35 U.S.C. 154(b) by 0 days.

(21) Appl. No.: 09/808,161

(22) Filed: Mar. 13, 2001

Related U.S. Application Data

(60) Division of application No. 09/511,933, filed on Feb. 24, 2000, now Pat. No. 6,231,763, which is a division of application No. 09/165,830, filed on Oct. 2, 1998, now Pat. No. 6,042,729, which is a continuation-in-part of application No. 09/025,231, filed on Feb. 18, 1998, now Pat. No. 6,254,772.

(51) Int. Cl.[7] .......................... B01D 24/36; B01D 24/46; F16K 11/085
(52) U.S. Cl. ........................ 210/266; 210/190; 210/278; 210/269; 210/284; 210/285; 210/288; 210/425; 210/426; 137/625.46
(58) Field of Search ................................. 210/278, 425, 210/426, 190, 266, 269, 284, 285, 288, 661; 137/625.46

(56) References Cited

U.S. PATENT DOCUMENTS

| | | | |
|---|---|---|---|
| 163,814 A | 5/1875 | Sinclaire |
| 171,056 A | 12/1875 | Sinclaire |
| 197,368 A | 11/1877 | Hobson |
| 1,432,351 A | 10/1922 | McGahan |
| 1,671,699 A | 5/1928 | Clark |
| 1,951,917 A | 3/1934 | Leslie |
| 2,101,961 A | 12/1937 | Slidell |
| 3,458,436 A | 7/1969 | Martinola |
| 3,523,762 A | 8/1970 | Broughton |
| 4,115,276 A | 9/1978 | Kelly |
| 4,196,081 A | 4/1980 | Pavia |
| 4,412,923 A | 11/1983 | Capitani |
| 4,642,192 A | 2/1987 | Heskett |
| 5,041,219 A | 8/1991 | Strand |
| 5,133,385 A | 7/1992 | Kawakami |
| 5,135,654 A | 8/1992 | Heskett |
| 5,149,437 A | 9/1992 | Wilkinson et al. |
| 5,164,082 A | 11/1992 | Lin |
| 5,171,442 A | 12/1992 | Nakshbendi |
| 5,205,932 A | 4/1993 | Solomon et al. |
| 5,242,589 A | 9/1993 | Kuo et al. |

(List continued on next page.)

FOREIGN PATENT DOCUMENTS

| | | |
|---|---|---|
| EP | 0 720 862 | 1/1996 |
| GB | 2 174 920 | 11/1986 |
| JP | 06-137442 A | 5/1994 |

OTHER PUBLICATIONS

"The 5600 Water Conditioning Control", undated.
"Owners Manual How to Maintain and Operate your Eco-Water Electronic Demand Water System", EcoWater Systems, St. Paul, MN, 8/95, 32 pages.
"Controls for Water Treatment", Fleck Controls, Inc., Brookfield, WI, 9/96, 8 pages.

Primary Examiner—Thomas M. Lithgow
(74) Attorney, Agent, or Firm—Cook, Alex, McFarron, Manzo, Cummings & Mehler, Ltd.

(57) ABSTRACT

Regeneration of water treatment media is disclosed which includes a water treatment unit having one or more media therein, and which upon initiation of flow of the water, imparts turbulence and abrasion to the treatment medium to automatically cleanse the medium of light solid contaminants, as well as contaminant coatings on the media. This greatly improves the operation of the media and extends its life. In addition, the water treatment unit disclosed may simply be rotated through any one of a number of positions between service, backwash, flush, off, and/or bypass operational modes for further regeneration of the treatment media.

29 Claims, 5 Drawing Sheets

U.S. PATENT DOCUMENTS

| | | |
|---|---|---|
| 5,340,478 A | 8/1994 | Strand |
| 5,415,770 A | 5/1995 | Heskett |
| 5,573,665 A | 11/1996 | Frommer et al. |
| 5,628,900 A | 5/1997 | Naito |
| 5,785,848 A | 7/1998 | Strand |
| 5,858,219 A | 1/1999 | Kusmierz |
| 5,879,565 A | 3/1999 | Kasmierz et al. |
| 6,042,729 A * | 3/2000 | Chau |

* cited by examiner

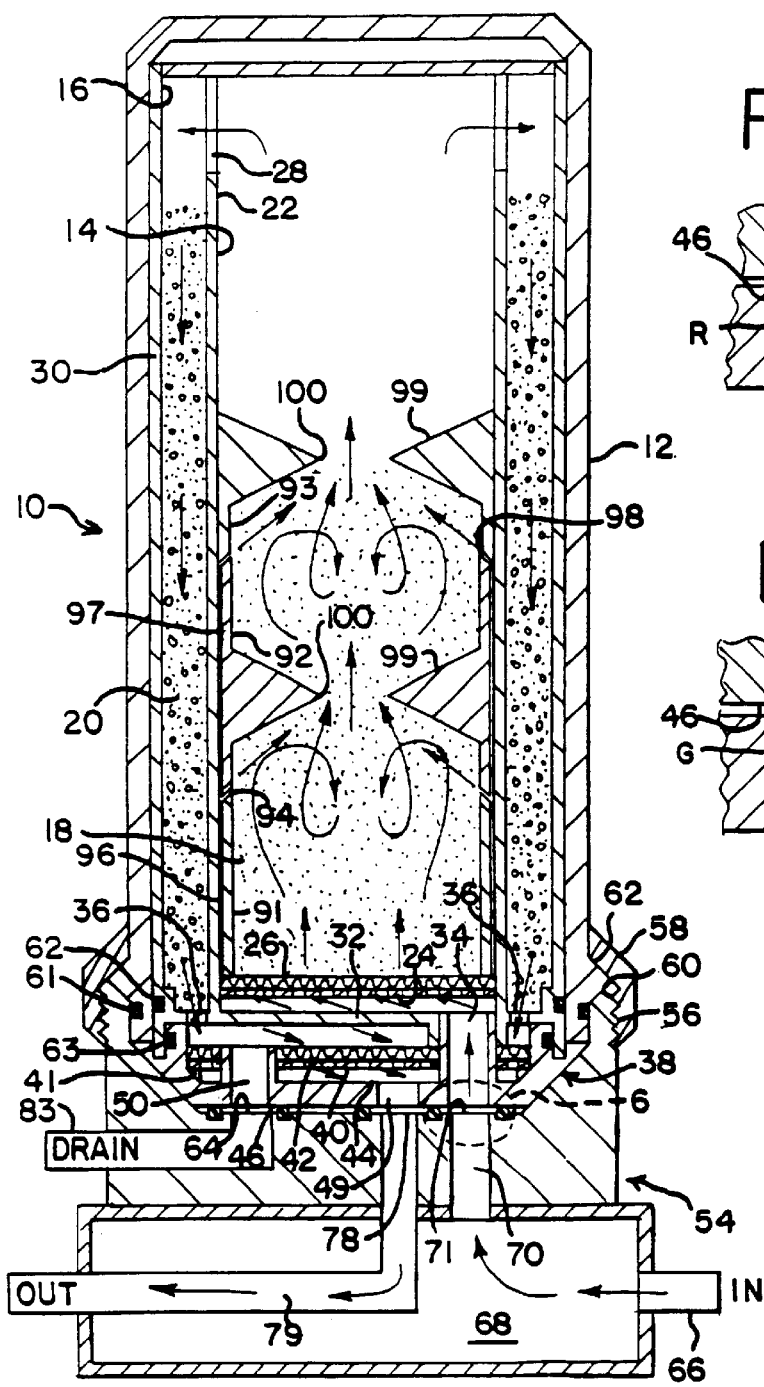
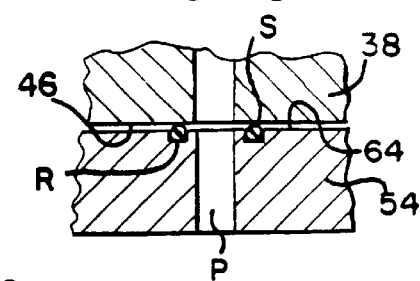
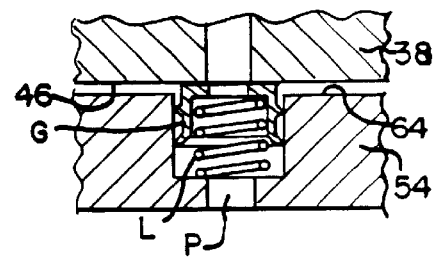

REGENERATION OF WATER TREATMENT MEDIA

RELATED APPLICATION

This application is a division of application Ser. No. 09/511,933, filed Feb. 24, 2000, now U.S. Pat. No. 6,231,763, which application is a division of application Ser. No. 09/165,830, filed Oct. 2, 1998, now U.S. Pat. No. 6,042,729, which application is a continuation-in-part of application Ser. No. 09/025,231, filed Feb. 18, 1998, now U.S. Pat. No. 6,254,772.

BACKGROUND AND SUMMARY OF INVENTION

The present invention is directed to the regeneration of water treatment media and, more particularly, to a water treatment unit having one or more media with a valve for the selective regeneration of the media, and to a method of regenerating the media.

Fluid treatment systems employing one or more fluid treatment media have been employed in the past for the treatment of various fluids, such as water, to remove various impurities and contaminants therefrom. In some of these systems, various different treatment media have been employed in serial relationship to each other so that for example one medium may have a beneficial effect on subsequent downstream media. For example, in HESKETT U.S. Pat. No. 5,415,770 it is disclosed that the use of certain finely divided metals, such as alloys of copper and zinc, may be employed as an upstream treatment medium to remove certain chemical constituents, such as residual chlorine, prior to subjecting water to other downstream water treatment media, such as activated carbon and/or an ion exchange medium. Removal of the chlorine is not only beneficial to the quality of the ultimate product, but it also improves the function, and life of the latter two media when present may be improved and extended.

In prior systems the several respective media are frequently located in several distinct units which are physically separated from each other and the fluids are passed through these distinct units in a serial fashion. These individual units can be individually serviced, but they are demanding of space and material. Where the several respective media are contained in a single container or tank, they are difficult to maintain separate from each other, particularly due to the wide disparity in weights and/or sizes of the respective media particles. Even where they can be maintained separate from each other, the placement of each of the media in the same tank makes it physically difficult to service or replace one medium without replacing the others due to their positioning relative to each other. Another disadvantage, particularly in small counter top water or tap mounted treatment units, such as shower head mounted units, is that no provision is usually possible to permit rinsing or backwashing of the media which, if possible, might greatly extend the life of the system and their respective media.

Another disadvantage in many water treatment units is that the flow through the treatment media during service is generally in a direction which tends to compact the medium. Thus, any dirt or other contaminants which are removed by the medium become trapped in the medium and accumulate to eventually clog the medium or interfere with its treatment function. When this occurs, it ends the life of the medium and requires its replacement.

It is the purpose of the present invention to avoid or eliminate the aforementioned disadvantages. In the present invention, a multimedia fluid treatment unit with an efficient control valve which is a part of the unit is provided which is compact, permits ready servicing of the unit and the utilization of a number of different media in the unit. In the present invention, the life of the unit is significantly extended and the effective amount of medium is reduced by selective arrangement of the several media relative to each other to remove compounds which might be harmful to some of the media, by providing for periodic rinsing and/or backwashing of the treatment medium, and/or by automatic regeneration of the medium upon initiation of normal fluid flow. Moreover, the portion of the unit which contains the media need only be simply manually rotated to effect such rinsing and backwashing. When needed, in the fluid treatment unit of the present invention any replacement and service of the unit and any treatment media therein are facilitated.

In one principal aspect of the present invention, a unit includes a rotatable valve which comprises a substantially disc shaped valve plate, a face on one side of the disc shaped valve plate, and a plurality of passages extending into the plate from openings in the face, with at least some of the passages extending through the thickness of the valve plate to communicate with the side of the plate opposite the face. The disc shaped valve plate is rotatable about an axis which extends at a substantial angle to the face. A valve housing having a face adjacent the valve plate face also has a plurality of passages therein which open to the valve housing face. A first of the valve housing passages communicates with a supply of fluid, a second of the valve housing passages communicates with a discharge for the fluid from the valve housing, and a third of the passages communicates with a drain from the valve housing. The valve plate is rotatable about its axis between a first position in which the fluid is supplied from the first passage in the valve housing to one of the passages through the valve plate, and from another of the passages through the valve plate to the second passage in the valve housing communicating with the discharge from the valve housing, and a second position in which the fluid is supplied from another of the passages in the valve housing to another of the passages through the valve plate, and from another of the passages through the valve plate to the third passage in the valve housing communicating with the drain from the valve housing.

In another principal aspect of the present invention, the faces are substantially planar and parallel to each other, and the axis of the plate is substantially perpendicular to the planar faces.

In still another principal aspect of the present invention, a plurality of seals on at least one of the faces are selectively alignable with ones of the passages which open through the other of the faces when the other of the faces is rotated relative to at least one of the faces as the valve plate is rotated.

In still another principal aspect of the present invention, the seals may comprise O-rings and/or spring loaded gaskets.

In still another principal aspect of the present invention, the unit also includes in combination with the rotatable valve, a housing containing at least one fluid treatment medium. When the valve plate is in the first position, the fluid is supplied from the first passage from the fluid supply in the valve housing to one of the passages through the valve plate and to the fluid treatment medium, and from the fluid treatment medium to another of the passages through the valve plate to the second passage in the valve housing communicating with the discharge from the valve housing to provide fluid which has been treated by the fluid treatment medium through the discharge. When the valve plate is in the second position, the fluid is supplied from another of the passages in the valve housing to another of the passages through the valve plate and to the fluid treatment medium, and from the fluid treatment medium to another of the passages through the valve plate and the third passage in the valve housing communicating with the drain from the valve housing to backwash the fluid treatment medium.

In still another principal aspect of the present invention, the valve plate is also rotatable to at least one or more additional positions which include a rinse position in which fluid passes from the fluid supply through the fluid treatment medium to rinse it and therefrom to the drain, an off position in which fluid flow through the unit is turned off or a bypass position in which fluid is bypassed around the fluid treatment medium from the fluid supply through the valve plate and to a fluid discharge from the valve housing.

In still. another principal aspect of the present invention, when the valve plate is in the second position, fluid is supplied from the fluid supply to the fluid treatment medium to backwash the fluid treatment medium.

In still another principal aspect of the present invention, the valve housing includes a passage for communication with a source of brine for regeneration of the fluid treatment medium, and when the valve plate is in the second position, fluid is supplied from the source of brine through the last mentioned passage to the fluid treatment medium to regenerate the fluid treatment medium.

In still another principal aspect of the present invention, the housing containing the fluid treatment medium is fixed to the valve plate, whereby the valve plate is rotated between the first and second positions by rotation of the housing.

In still another principal aspect of the present invention, a fluid treatment unit comprises a housing having a chamber therein which is of a given volume, and finely divided loose fluid treatment medium in the chamber and which occupies a volume which is substantially less than the given volume of the chamber when fluid to be treated is not flowing through the medium. The chamber has an inlet for introducing the fluid to be treated to the chamber and beneath the fluid treatment medium in the chamber, and an outlet to the chamber downstream of the fluid treatment medium for discharging the fluid which has been treated from the chamber. The unit is constructed and arranged to lift the loose fluid treatment medium in a controlled manner upon initiation of flow of fluid to be treated from the inlet to flush and remove contaminants from the medium, to suspend the medium during continuing flow of the fluid, and to permit the medium to settle to the bottom of the chamber when the flow of fluid has ceased.

In still another principal aspect of the present invention, the chamber has a height which is greater than its maximum width, and the chamber includes at least one portion intermediate its height which portion has a width substantially less than the maximum width to reduce the rate at which the medium is lifted in the chamber as the flow of fluid is initiated.

In still another principal aspect of the present invention, the cross-sectional area of the portion is about 5–50%, and more preferably about 10% of the cross-sectional area of the chamber at its maximum width.

In still another principal aspect of the present invention, a plurality of the portions are spaced from each other along the length of the chamber.

In still another principal aspect of the present invention, an additional inlet is positioned intermediate the length of the chamber and which is associated with the lesser width portion to introduce additional fluid to be treated to the chamber adjacent the lesser width portion.

In still another principal aspect of the present invention, the lesser width portion comprises a sleeve positioned in the chamber.

In still another principal aspect of the present invention, the medium is a particulate metal selected from the group consisting essentially of copper, zinc and mixtures thereof, and is preferably an alloy of copper and zinc.

In still another principal aspect of the present invention, a method of rapidly regenerating a finely divided loose fluid treatment medium upon initiation of the treatment of the fluid, comprises permitting the finely divided loose fluid treatment medium to settle into a bed following a preceding treatment of the fluid, by ceasing or reducing the fluid flow to an amount insufficient to suspend the medium, initiating the flow of fluid to be treated beneath the bed of the finely divided loose fluid treatment medium, with the flow as initiated being of sufficient magnitude to lift the finely divided loose fluid treatment medium from the bed while restraining the rate at which the medium is lifted to thoroughly separate and flush away contaminants that may have previously accumulated on the bed, and continuing to maintain the flow of fluid to be treated in a manner sufficient to continue to maintain the loose fluid treatment medium suspended in the flowing fluid during treatment of the fluid.

In still another principal aspect of the present invention, the method. includes selectively restraining the rate at which the medium is lifted at least at one to two locations over the path of the flow during the initiation of flow of fluid.

In still another principal aspect of the present invention, in the method the rate at which the medium is lifted is restrained by passing the lifted fluid treatment medium through a cross-sectional area which is about 5–50%, and more preferably about 10% of the maximum cross-sectional area of the bed.

In still another principal aspect of the present invention, the method includes introducing additional fluid to be treated at least at one location over the path of flow during the initiation of flow of fluid.

In still another principal aspect of the present invention, in the method of the invention, the medium is a particulate metal selected from the group consisting essentially of copper, zinc and mixtures thereof, and is preferably an alloy of copper and zinc.

In still another principal aspect of the present invention, the fluid being treated is water.

These and other objects, features and advantages of the present invention will be more clearly understood through a consideration of the following detailed description.

BRIEF DESCRIPTION OF THE DRAWINGS

In the course of this description, reference will frequently be made to the attached drawings in which:

FIG. 3 is an overall, cross-sectioned elevation view of the unit and valve shown in FIG. 1, but in which fluid flow for treatment has been initiated;

FIG. 6 is a broken, cross-sectioned view of the O-ring seal embodiment substantially viewed within circle 6 in FIG. 3; and FIG. 7 is a broken, cross-sectioned view of a spring loaded gasket embodiment of seal.

DESCRIPTION OF THE PREFERRED EMBODIMENT

Figures 1, 2:
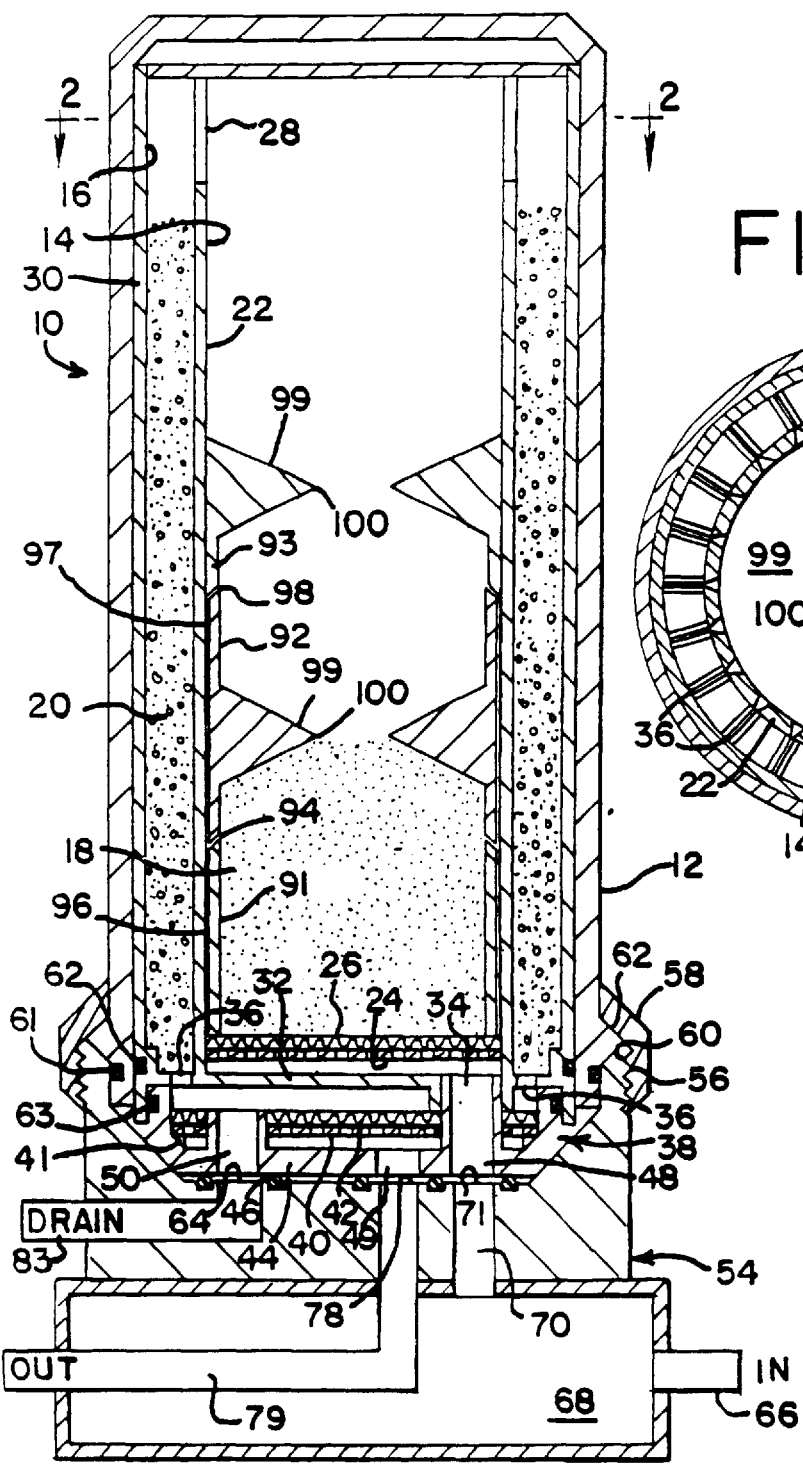
FIG. 1 is an overall, cross-sectioned elevation view of a preferred embodiment of fluid treatment unit incorporating the principles of the present invention and while the unit is at rest following prior fluid treatment and before the initiation of fluid flow for subsequent treatment.
FIG. 2 is a cross-sectioned, plan view of the unit as viewed substantially along line 2—2 of FIG. 1, and without the treatment media.

A multimedia fluid treatment unit 10 is shown in FIGS. 1–4. In a preferred application, the unit 10 may be a counter top or under the counter unit or may be a water tap mounted unit, such as a shower head unit for the treatment of municipal or other potable water supply.

The unit 10 preferably comprises an outer housing 12 having two chambers 14 and 16 therein for containing preferably dissimilar water treatment media 18 and 20 in the respective chambers. The inner chamber 14 is preferably defined by an inner vertical cylindrical sidewall. A perforated plate 24 is positioned adjacent the bottom of the inner chamber 14, and it, in turn, provides a support plate for a mesh screen 26 which supports the treatment medium 18 when there is little or no fluid flow through the unit.

A plurality of vertical slots 28 are positioned at the top of the sidewall 22. The slots 28 preferably decrease. in width over the thickness of the sidewall and in the normal fluid service flow direction toward the chamber 16, as best viewed in FIG. 2, so that the minimum slot width is at the flow discharge side of the slots under normal service operation from the chamber 14 to the chamber 16. The minimum width of the slots 28 is selected to be slightly narrower than the smallest size of the finely divided water treatment medium 18 in the chamber 14 as well as the minimum size of the medium 20 in the chamber 16. This prevents the medium 18 from passing from the chamber 14 during service operation, and minimizes the possibility of the medium lodging in the slots permanently, because on backwash any medium 18 which may get stuck in the slots will be backflushed back into chamber 22. This also prevents the loss of medium 20 to the chamber 22 and the medium 18 during backwash.

The outer annular chamber 16 surrounds the inner chamber 14 and is defined by the sidewall 22 and the outer sidewall 30. A floor plate 32 preferably extends across the entire width between the outer side wall 30 and is formed integrally therewith. The floor plate 32 includes an opening 34 which defines the fluid inlet for the unit as seen by the arrows in FIGS. 3 and 4. The floor plate 32 also defines the bottom of chamber 14 for receiving the fluid which is to be treated and passing it to the fluid treatment medium 18. In addition, the floor plate 32 between the inner sidewall 22 and outer sidewall 30 includes a plurality of outwardly extending slots 36 which are similar to the vertical slots 28 in that they are wider at the side facing the fluid treatment medium 20 and narrower at the discharge side thereof for the reasons previously described with respect to the vertical slots 28 at the top of the inner sidewall 22.

Figure 4:
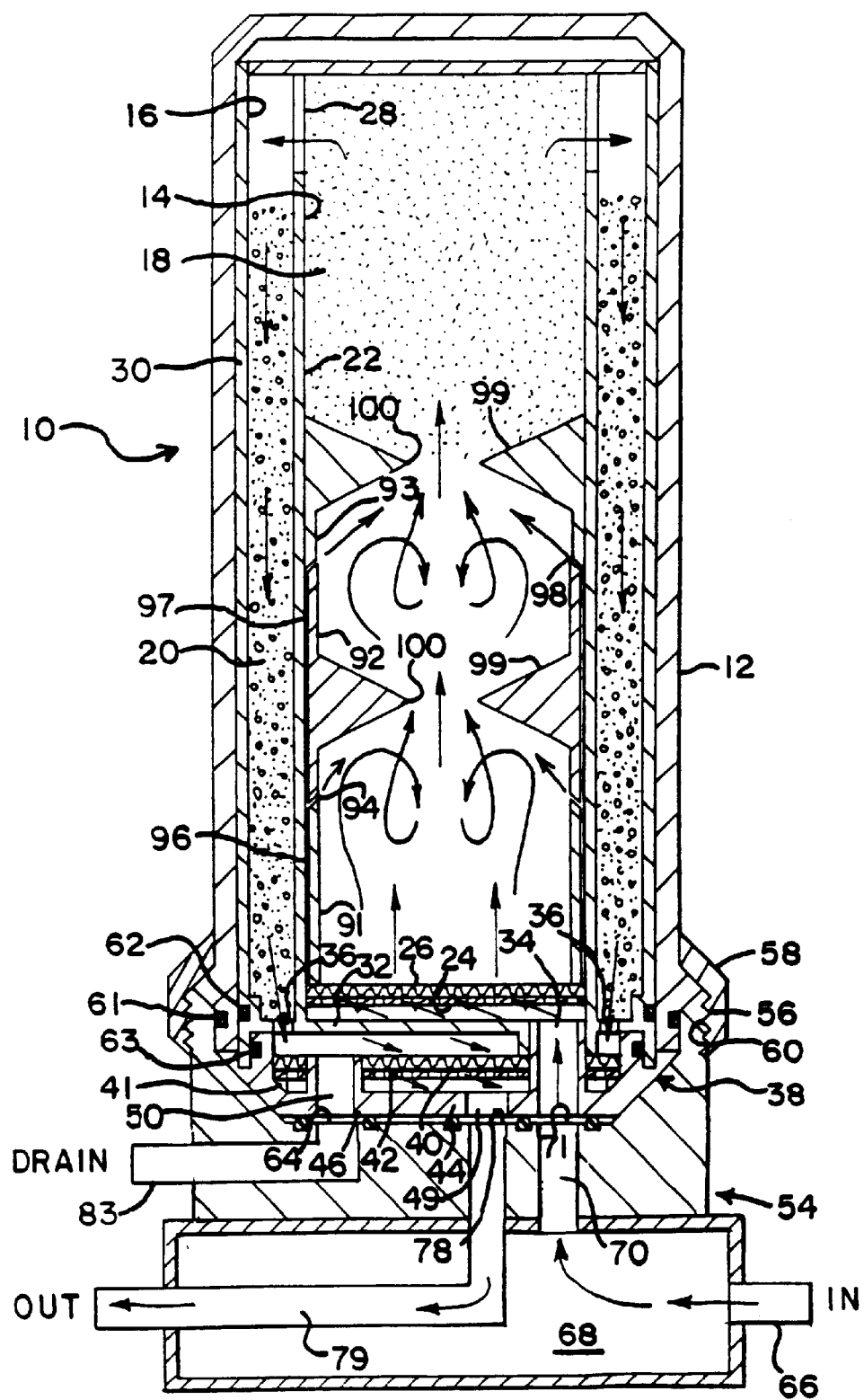
FIG. 4 is an overall, cross-sectioned elevation view of the unit and valve shown in FIG. 3, but in which fluid flow for treatment continues following initiation.

The unit 10 also includes a generally disc shaped valve plate 38 which is firmly mounted to the bottom of the outer sidewall 30, as best seen in FIGS. 1, 3 and 4. The valve plate 38 is preferably upwardly cup shaped as shown in the drawings to receive a perforated support plate 40. The support plate 40 preferably rests upon a shoulder 41, as seen in FIGS. 1, 3 and 4, and it supports a fine mesh screen 42 which is preferably of finer mesh than the mesh of screen 26 at the floor of chamber 14. The mesh size of screen 42 which is, for example about 0.5 microns, has the purpose of retaining any extremely small fines that may be able to make their way through the respective media or may constitute the smallest of the particle sizes of the media which are able to find their way through the media and the slots 36 with the treated fluid. These extremely small fines will be retained on the fine mesh 42 until flushed from the system during the flush cycle to be described below.

The flat disc shaped bottom 44 of the cup shaped valve plate 38 contains several passages, only some of which are seen in FIGS. 1, 3 and 4, and all of which are seen in FIG. 5. These passages in the flat disc shaped bottom of the valve plate 38 open to its bottom face 46. They include passages 48, 49 and 50, all of which are shown in FIG. 5, and all of which pass through the valve plate 38, and a U-shaped bypass passage 52. The bypass passage 52 does not pass through the valve plate 38. Both of its ends open to the bottom face 46 of the valve plate.

The unit 10 also includes a valve housing 54 which is attached to the bottom of the housing 12 and in underlying relationship to the valve plate 38 as best seen in FIGS. 1, 3 and 4. The valve housing 54 also preferably presents an upwardly facing cup shaped body which receives the cup shaped valve plate 38 therein, and which includes outwardly facing threads 56 at the top of the cup.

A coupling ring 58 which also has threads 60 is threaded onto the threads 56 of the valve housing 54 to couple the valve housing to the bottom of the housing 12 with the valve plate 38 in between. The bottom of the housing 12 preferably includes an enlarged annular shoulder 62 which is trapped between the upper end of the valve housing 54 and the coupling ring 58 when the ring is installed to attach the unit components together. This coupling arrangement permits the housing 12 and top of the valve housing 54 to rotate relative to each other. However, the valve plate 38 is fixed to the housing 12 so that it rotates with the housing and relative to the valve housing 54. Suitable O-rings 61, 62 and 63 are provided at this juncture to insure that the parts which interfit with each other are sealed against leakage.

The valve housing 54 includes a number of passages, ports and seals, all as best seen in FIG. 5, for the conduction of fluid to and from the housing 12 of the unit and the treatment media therein. Prior to discussing these ports and passages specifically, it should be generally noted with reference to FIG. 5 that seals which do not have a port or a passage associated therewith through the valve housing 54, i.e. "blind" seals, are denoted in solid black. This is in contrast to "port" seals which are shown in outline only in FIG. 5 and which are associated with a port, for example the port at the top of port passage P as shown in FIG. 6. The blind seals as well as the port seals S, as shown in FIG. 6, are preferably located in shallow annular recesses in the upwardly facing face 64 of the valve housing 54. In the alternative, a gasket G may be spring loaded by a spring L upwardly against the bottom face 46 of the valve plate 38, as shown in FIG. 7. The gasket arrangement as shown in FIG. 7 is particularly advantageous to compensate for less than perfect tolerances between faces 46 and 64 as the valve plate 38 is rotated through its various operational modes as will be discussed below, because the spring loaded gasket provides a better, more consistent seal.

Figure 5A:
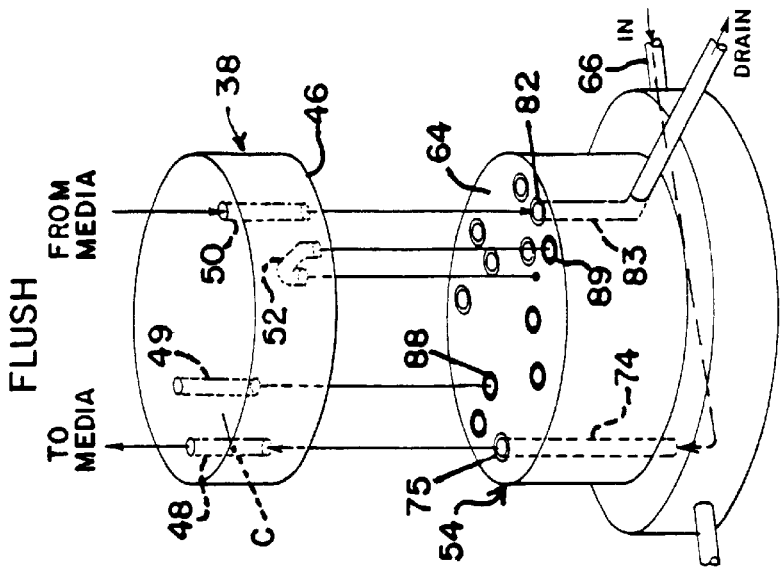
FIGS. 5A–5E are exploded, sequential perspective views of a preferred embodiment of control valve of the present invention, and showing the valve components in the service position in FIG. 5A, the backwash position in FIG. 5B, the flush position in FIG. 5C, the off position in FIG. 5D and the bypass position in FIG. 5E.
Figure 5B:
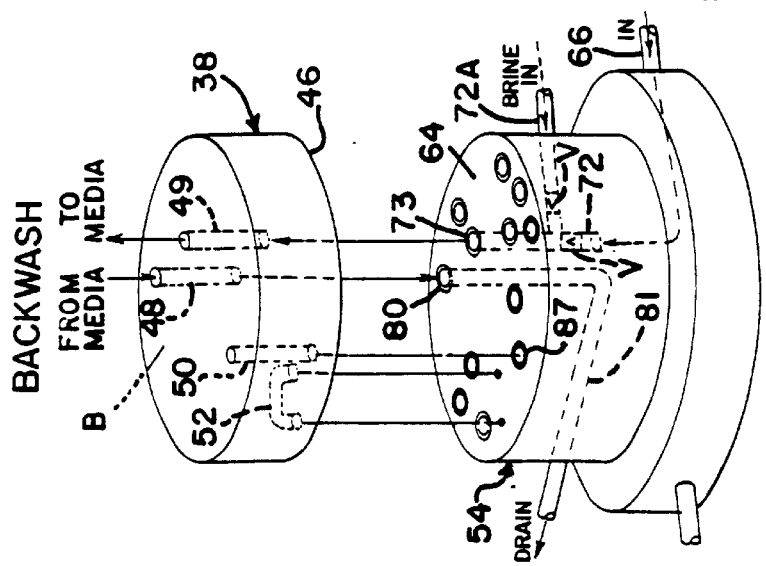
Figure 5C:
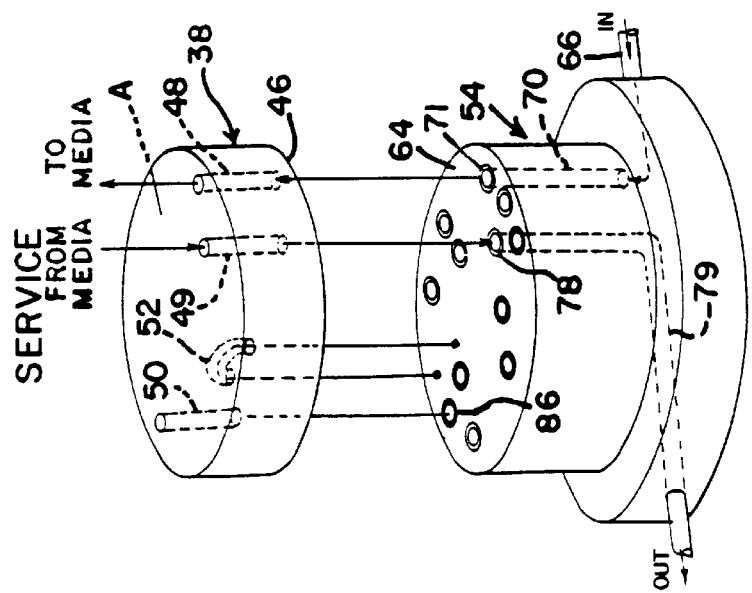
Figure 5E:
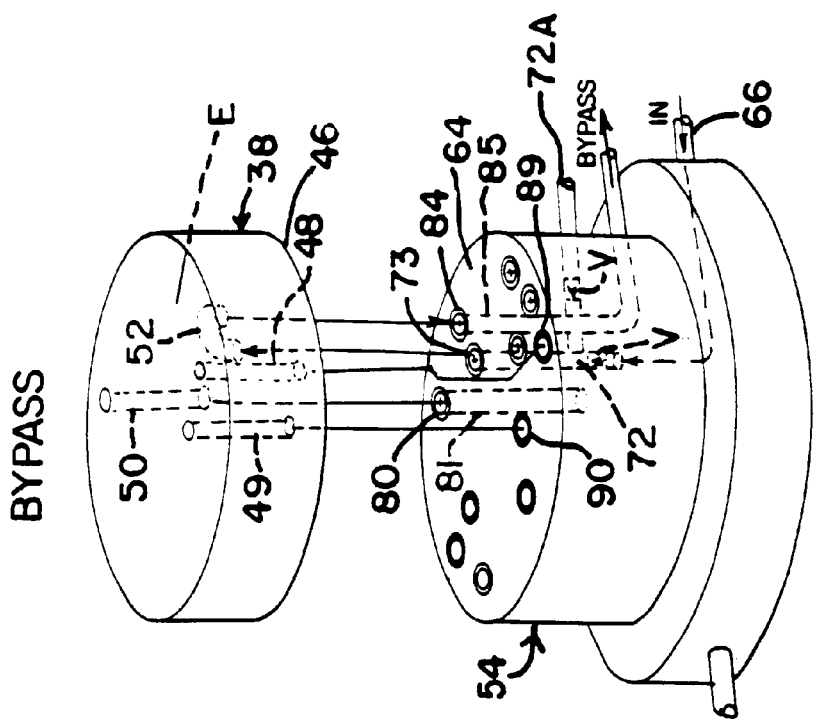

A fluid inlet 66, for example from a municipal water supply, provides water to a compartment 68 in the valve housing 54, as best seen in FIGS. 1, 3 and 4. Any one of several passages are connected to the compartment 68 to receive water from the compartment 68 and conduct the water through the valve plate 38 to media 18 and 20 for interaction with the media, or to bypass the water past the media. These passages and ports in the valve housing 54 which communicate the supply fluid from compartment 68 include (a) passage 70 and its port 71 which communicate the supply fluid to be treated to the passage 48 in the valve plate 38 and to the media during the service operational mode, as seen in FIG. 5A; (b) passage 72 and its port 73 which communicate the supply fluid to passage 49 in the valve plate 38 and to the media during the backwash operational mode, as seen in FIG. 5B; (c) passage 74 and port 75 which communicate the supply fluid to the passage 48 in the valve plate 38 and to the media during the flush operational mode as seen in FIG. 5C; and (d) passage 72 and its port 73 which align with the U-shaped bypass passage 52 in the valve plate 38 during the bypass operational mode, as seen in FIG. 5E. Again referring to FIG. 5, fluid discharged from the media is discharged (a) through the passage 49 in the valve plate 38 to the port 78 and discharge passage 79 for treated fluid from the valve housing 54 in the service operational mode, as seen in FIG. 5A; (b) through the passage 48 in the valve plate 38 to the port 80 and its passage 81 in the valve housing 54 to drain during the backwash operational mode, as seen in FIG. 5B; (c) through the passage 50 in the valve plate 38 to the port 82 and its drain 83 in the valve housing 54 in the flush operational mode, as seen in FIG. 5C; and (d) from the U-shaped bypass passage 52 in the valve plate 38 and through the port 84 and bypass passage 85 in the bypass operational mode, as seen in FIG. 5E.

In addition to the port seals associated with the last mentioned ports in the face 64 of the valve housing 54, various blind seals 86–90 are positioned on the face 64 in the various positions as seen in FIG. 5. various passages in the valve plate 38 will align with these blind seals during certain operational modes. However, flow through those valve plate passages will be precluded because of the fact that these seals are blind. These respective blind seals 86–90 have only been numbered in the mode figures in which a passage in the valve plate 38 actually has been positioned so as to be in alignment with the particular blind seal in order to simplify the respective FIGS. 5A–5E.

In the event that one of the media is an ion exchange medium, it may be desirable to backwash with a brine solution to regenerate the medium, rather than with simple water. In this event, a brine passage which is connected to a suitable brine supply (not shown) may be tapped into the passage 72. In this event, suitable check valves V are provided in the brine passage 72A and at the outlet from compartment to prevent back up of service supply water to the brine supply and/or brine to the service supply water in the compartment 68.

In addition to the regeneration of the fluid treatment media as the result of the backwashing and rinsing which have been briefly referred to already, and which will be discussed in more detail below, the unit of the present invention is also constructed and arranged to produce frequent and immediate regeneration of the treatment medium 18 each time the unit is started up. This is advantageous where the unit is a counter top or under the counter unit for the treatment of a municipal or other potable water supply, and even more advantageous where the unit is a showerhead unit because in that usage, the initial water flow is typically discarded anyway. In such uses, the water which is to be treated is typically turned on and off with some frequency. When off, no treatment of the water is taking place and when on, the water being consumed is undergoing treatment. In particular, where the treatment medium is a finely divided copper-zinc metal, such as disclosed in the previously mentioned U.S. Pat. No. 5,415,770, it is advantageous to briefly and frequently regenerate the medium on initial start up to remove any light solid contaminants which may have settled on the medium while the unit has been shut off. These light contaminants will typically settle on the upper surface of the settled treatment medium bed 18 during shut down because they are substantially lighter and, therefore, will settle more slowly by gravity than the heavier metal particulates. Conversely, when an energetic fluid flow is reinitiated, as in the present invention, these lighter solid contaminants will move away from the medium 18 at a much faster rate than the heavier metal particulate medium 18 will move, and the light contaminants will be flushed from the system.

Particularly advantageous is the flushing of the surface of the medium to remove oxidization products, such as the chloride salts from chlorine, which may have coated the surface during prior water treatment so that the surface is again exposed to its fullest extent to react with the newly arriving oxidizing contaminants. This removal of oxidants from the surface of the metal particles will greatly enhance the life span of the particulate metal medium to from as little as six months to one year to two to three years. At the same time, this frequent regeneration permits a reduction in the amount of metal particulate medium needed to perform the same treatment of as much as 30–50%.

In order to accomplish this initial substantial regeneration, the chamber 14 is tall and relatively narrow at its maximum width. This ensures that the flow rate through the chamber from the input end at support plate 24 to the fluid discharge through the slots 28 will be sufficient to permit medium 18 to be progressively suspended and agitated, as shown in FIGS. 3 and 4 upon start up of the unit so that the particles will aggressively abrade each other to remove the oxidation product coating thereon.

In order to maximize this early abrasion and turbulence of the particles upon start up, the lifting of the particles is slowed and throttled. This is accomplished in the invention by one or more sleeves 91, 92 and 93 which are installed into the chamber 22. The bottom sleeve 91 is preferably a simple cylinder which at the top may be more or less crenelated to produce inlet orifices 94 for introducing inlet fluid to be treated at a higher elevation in the chamber 22 to enhance turbulence effect on the water treating medium 18, as seen by the arrows in FIGS. 3 and 4. The external diameter of the sleeve 91 preferably is slightly less than the internal diameter of the inner sidewall 22 of the chamber 14 to provide an annular channel 96 from the fluid inlet beneath plate 24 and upwardly about the sleeve 91 to the inlet orifices 94.

The next upper sleeve 92 is also preferably somewhat less in external diameter than the interior diameter of the inner sidewall 22 so that an annular channel 97 is also provided to conduct inlet fluid further up the chamber to inlet orifices 98 between the top of sleeve 92 and the bottom of the uppermost sleeve 93.

The principal purpose of the sleeves 92 and 93 is to provide one or more spaced shelves 99 which extend inwardly from the sidewall 22 of the chamber. Sleeves 99 provide substantially reduced cross sectional areas in the chamber 22 at spaced locations along the height of the chamber by way of apertures 100, as seen in FIGS. 1, 3 and 4, which are much narrower than the maximum cross-sectional area of the chamber 22. Without these apertures 100, the particulate medium 18 would become rapidly suspended at the top of the chamber 22 on start up and, thus, would not have the maximum ability to extensively abrade each other in close contact. However, the much smaller cross sectional area apertures 100 reduce the rate at which the particulate medium will ascend, and will produce a much more intimate relationship between the particles upon start up. These narrowed apertures 100, together with the orifices 94 and 98 which inject fluid adjacent these apertures, will result in substantial turbulence in the flow and suspension of the particulate water treatment medium 18, as seen in FIG. 3.

The maximum diameter of the chamber 14 may vary widely, but will typically be anywhere between a fraction of an inch up to as much as a foot or more. What is important is the relationship of the cross section area of the aperture 100 to the maximum cross-sectional area of the aperture 100 to the maximum cross-sectional area of the chamber 22. This aperture area should be about 5–50% of the maximum cross-sectional area of the chamber 14, with about 10% preferred, to achieve the desired regeneration.

The medium 20 in the outer chamber 16 may take any one of a number of forms. It may be an ion exchange resin for the removal of undesirable ions, such as a cationic resin for the removal of hardness from the water or an anionic resin for the removal of undesirable nitrates or organic contaminants. It may also be a particulate activated carbon for the removal of various odors, flavors or other organic contaminants as are well known in the art. Indeed, where the water treatment medium 20 is either an ion exchange resin or an activated carbon, the use of a particulate, finely divided metal as the upstream medium 18 can actually prolong the life of the later contacted medium by removing residual chlorine from the water, because chlorine has a deleterious effect on either an ion exchange medium or activated carbon.

Although it is believed that the operation of the water treatment unit of the present invention will be evident to those skilled in the art from the forgoing description, a detailed description of the operation follows.

Referring particularly to FIG. 1, the fluid treatment unit 10 is shown in its at rest condition after a preceding treatment operation and awaiting start up for the next treatment operation. In this condition, the unit is in its service operational mode as shown in FIG. 5A so that as soon as fluid flow is again initiated, for example of a municipal water supply, the unit is prepared to start its next treatment operation. In this at rest condition, no flow of water is occurring through the unit and the water treatment medium 18, for example the finely divided, particulate metal particles as disclosed and described in the aforementioned U.S. Pat. No. 5,415,770, has settled to the bottom of the chamber 14 to form a relatively compact, condensed bed at the bottom of the chamber, as seen in FIG. 1. When the unit was brought to its at rest condition following a preceding treatment operation, the particulate metals which are of considerable weight will have rapidly settled to the bottom of chamber 14 to form the bed as shown in FIG. 1. However, most other solid contaminants which are lighter than the metal particles and which might have been present when the previous treatment operation was ceased will settle at a slower rate and become deposited on the top of the bed of metal particles.

In this at rest condition in which the unit is in its service operational mode, the valve plate 38 will have been rotated to the position A in FIG. 5A so that it is in the service position when fluid flow is reinitiated. In this service position A, the passage 48 in the valve plate 38 is aligned with the passage 70 and its port 71 in the valve housing 54 in readiness to conduct the service fluid which is to be treated to the media for treatment when flow is reinitiated. Passage 49 in valve plate 38 is also aligned with port 78 and passage 79 in the valve housing 54 to conduct fluid from the media which has been treated to discharge it from the valve housing 54.

When the flow of fluid is to be initiated for treatment, the fluid will enter the supply conduit 66 from the source of supply of the fluid (not shown), for example a municipal service supply of water, and the water will fill the compartment 68 in the bottom of the valve housing 54 under pressure. As best seen in FIG. 3, this fluid to be treated will then flow upwardly through passage 70 and port 71 in the valve housing 54, through the opening 34, through the space above the floor plate 32 in the chamber 14 and upwardly through the support plate 24 and mesh screen 26 into the fluid treatment medium 18.

This initial flow will commence the automatic cleaning of the medium 18 as previously described by flushing any loose, lighter contaminant solids which may have previously settled back onto the surface of the medium bed, upwardly and out through the vertical slots 28 at the top of chamber 14 for ultimate discharge from the unit. As shown in FIG. 3, this initial flow will also tend to displace the finely divided, particulate medium 18 in the bed upwardly from its previously settled, at rest position as shown in FIG. 1. This upward flow, coupled with the jetting action from the input water which passes through the annular channels 96 and 97 and which is jetted through the inlet orifices 94 and 98 adjacent the shelves 99, and also coupled with the restraint of the upward flow of the particulate medium 18 by the shelves and narrowed apertures 100, will result in substantial turbulence in the medium, as depicted by the arrows in FIG. 3, and abrasion of the particles against each other. Without the restraint by shelves 99, the particulate medium 18 would immediately flow to the top of the chamber 14 with a minimum of turbulence and abrasion.

The considerable agitation and turbulence in the particulate medium 18 upon start up will remove substantial percentages of the oxidation contamination products, for example the chloride salts from chlorine, which have previously accumulated on the surface of the particulate metal medium. This results in an automatic cleaning action which flushes these previously removed contaminants from the system upon at the beginning of each start up and presents a fresh metal surface on the particulate medium 18 which maximizes the removal of the undesirable oxidants in the next batch of fluid to be treated. It has been found, for example, that 50–90% of the oxidation products which were previously coated upon the particulate metal surface of medium 18 will be removed within a few seconds following start up. This is particularly desirable for example in a shower head treatment installation in which the first several seconds of water flow is discarded anyway.

As the flow of water continues, all of the particulate medium 18 will eventually become suspended in the upper part of chamber 14, as viewed in FIG. 4, where it will continue to treat the continuing flow of water as it passes through that chamber. Once treated by the suspended particulate medium 18, the water will flow through the vertical slots 28 at the top of sidewall 22 and downwardly through the medium 20 in chamber 16. As previously discussed, the medium 20 may take any one of a number of desired forms including various ion exchange resins and/or activated carbon.

After passing through the medium 20 as depicted by the arrows in FIG. 4, the treated water will pass through the slotted openings 36 in the floor plate 32, and then through the mesh screen 42 and support plate 40, passage 49 in the valve plate 38, and port 78 and passage 79 in the valve housing to be discharged from the valve housing, as shown in FIG. 5A. Any extremely fine contaminants which also may pass through the slots 36 will accumulate on the very fine mesh screen 42 for later flushing, as will be described below. No flow will pass through passage 50 in the valve plate 38 because it is aligned with blind seal 86 on the face 64 of the valve housing 54 as seen in FIG. 5A. Moreover, there will be no flow through the U-shaped bypass 52, as viewed in FIG. 5A, because it is rotated to a nonoperative position in which its openings are aligned with non-functional, inactive locations on the face 64 of the valve housing 54, as shown in FIG. 5A.

Notwithstanding the automatic regeneration feature of the present invention as previously described or in its absence, it will likely be desirable to further periodically regenerate one or both of the media after periods of extended use, and in a manner unlike and in addition to the auto cleaning feature previously described.

When it is desired to backwash the media, all that need be done is to rotate the housing 12 and the valve plate 38 which is fixed to its bottom, from the service position A shown in FIG. 5A to the backwash position B shown in FIG. 5B. The valve housing 54 remains stationary during this simple rotation of the housing between these operational modes. When the housing 12 and valve plate 38 have been located to the backwash position B, as seen in FIG. 5B, supply fluid will continue to flow through inlet 66 and into compartment 68, as seen in FIGS. 1, 3 and 4. However, passage 49 in the valve plate 38 will now be aligned with passage 72 and port 73 in the valve housing 54, and passage 48 in the valve plate 38 will now be aligned with port 80 and passage 81 on the valve housing 54. Accordingly, supply fluid will flow from the compartment 68 upwardly through passage 72, and its port 73, and through passage 49. This fluid will continue its flow reversely upwardly through the support plate 40 and mesh screen 42 to dislodge any fine particles which may have accumulated on that screen so that they may be flushed later through passage 50. Backflush flow will continue upwardly through slots 36 and the medium 20 in chamber 16, through the slots 28 at the top of chamber 14 and down through the bed of medium 18, the mesh screen 26 and support plate 24, through passage 48 in valve plate 38, as seen in FIG. 5B, and port 80 and passage 81 to drain where it is discharged and discarded.

In the event that the medium 20 is an ion exchange resin for the removal of water hardness, nitrates or other undesirable contaminants, the backwashing fluid would preferably consist of a brine of sodium salts or potassium salts or the like for the regeneration of the ion exchange medium, rather than just simple water from a municipal service supply. In this event, the brine will be introduced from a suitable source of brine (not shown) through passage 72A and into passage 72 where the brine flow will continue to flow as previously described in the backwash description, as shown in FIG. 5B. Also where the unit includes provision for the introduction of brine, suitable check valves V will be included in passages 72 and 72A, as shown in FIGS. 5B and 5E, to preclude improper flow of fluids between the water supply and brine supply, or vice versa.

With further reference to the backwash position B shown in FIG. 5B, it will be seen that passage 50 in the valve plate 38 is effectively immobilized because it is aligned with the blind seal 87 on the face 64 of the valve housing 54. The U-shaped bypass passage 52 in the valve plate 48 is also effectively immobilized because it is aligned with a non-functional, inactive area on the face 64 of the valve housing 54, as shown in FIG. 5B.

If it is desired to flush the fluid treatment media, the housing 12 with the valve plate 38 fixed thereto is simply further rotated to the flush position C as shown in FIG. 5C. In this position passage 48 in the valve plate 38 is aligned with port 75 and passage 74 in the valve housing 54. Passage 74 communicates with the compartment 68 in the valve housing 54. Passage 50 in the valve plate 38 is aligned with port 82 and passage 83 to drain in the valve housing 54, as shown in FIG. 5C. Accordingly in this flush position C, supply fluid flows through the inlet 66, the compartment 68 and through passage 74 and port 75 in the valve housing 54, through the passage 48 in the valve plate 38, and to the media to flush the media. The fluid flow through the media is in the same direction as it is during the service mode as previously described. The fluid which leaves the media following flushing then flows into the chamber beneath floor plate 32 to flush any fines which may have been dislodged from mesh 42 through passage 50 in the valve plate 38 and port 82 and passage 83 in the valve housing 54 to be discharged to drain.

As will be seen in FIG. 5C, the passage 49 in the valve plate 38 is immobilized because it is aligned with the blind seal 88 on the face 64 of the valve housing 54. The U-shaped bypass passage 52 is also immobilized because one of its ends is aligned with the blind seal 89 and the other end with a non-functional, inactive area on the face 64 of the valve housing 54, as seen in FIG. 5C.

Figure 5D:
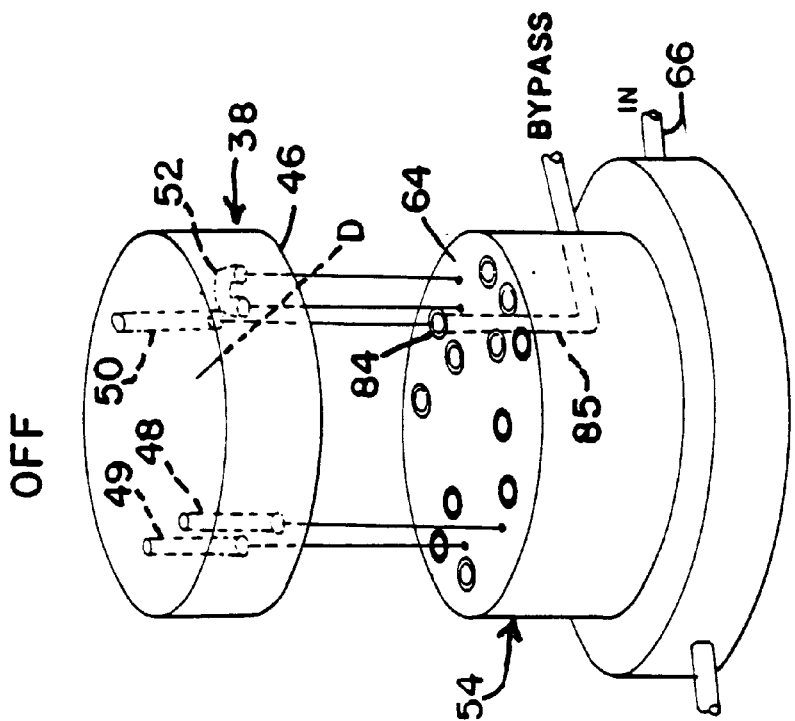

If desired, the entire unit may simply be turned off by further rotating the housing 12 and the valve plate 38 which is fixed to it to the off position D, as shown in FIG. 5D. In this position, all of the passages in the valve plate 38 are either aligned with nonfunctional, inactive areas on the face 64 of the valve housing 54 or with a drain discharge. More specifically, passages 48 and 49 as well as the U-shaped bypass passages 52 in valve plate 38 are aligned with non-functional, inactive areas on the face 64 of the valve housing 54 when the valve plate 38 is in the off position D. The only other passage 50 in the valve plate 38 is aligned with the bypass discharge port 84 and passage 85. Accordingly, no fluid flow occurs from or to the unit in this off position D.

If it is desired to bypass the fluid past the treatment media, the housing 12 and valve plate 38 are rotated to the bypass position E, as shown in FIG. 5E. In this position, one leg of the U-shaped bypass passage 52 in valve plate 38 is aligned with passage 72 and port 73 on the valve housing 54 and the other leg of the U-shaped bypass passage 52 is aligned with port 84 and passage 85 in the valve housing 54. Accordingly, in the bypass position E, supply fluid will flow from the inlet 66 to compartment 68, through passage 72 and port 73 in the valve housing 54, through the U-shaped bypass passage 52 in the valve plate 38, and out through port 84 and passage 85 through a bypass discharge in valve housing 54. Any flow to the brine passage 72A will be blocked by its check valve V.

When the valve plate 38 is in the bypass position E as shown in FIG. 5E, the remaining passages through the valve plate 38 are immobilized. Passage 49 in valve plate 38 is aligned with blind seal 90, passage 50 is aligned with port 80 and drain passage 81 which is currently nonfunctional and inactive, and passage 48 in valve plate 38 is aligned with blind seal 89 on the face 64 of the valve housing 54.

Although as many as five operational modes have been described with reference to FIGS. 5A–5E, it will be appreciated that the unit of the present invention may be simplified by eliminating one or more of the described operational modes without departing from the spirit of the invention. Any such modification of the valve plate 38 and/or valve housing 54 to eliminate operational modes is well within the skill of those in the art after considering the more complex multiple modes which have been thoroughly explained and described with reference to FIGS. 5A–5E.

It will also be understood that the preferred embodiment of the present invention which has been described is merely illustrative of the principles of the present invention. Numerous modifications may be made by those skilled in the art without departing from the true spirit and scope of the invention.

What I claim is:

1. A unit including a rotatable valve comprising;
   a substantially disc shaped valve plate, a face on one side of the disc shaped valve plate having openings in said face, and a plurality of passages extending into said plate from said openings in said face, with at least some of said passages extending through the thickness of said valve plate to communicate with the side of said plate opposite the face, said disc shaped valve plate being rotatable about an axis which extends at a substantial angle to said face; and
   a valve housing having a face adjacent said valve plate face, said valve housing also having a plurality of passages therein and opening to said valve housing face, first of at least one of said valve housing passages communicating with a supply of fluid, second of at least one of said valve housing passages communicating with a discharge for said fluid from said valve housing, and third of at least one of said valve housing passages communicating with a drain from said valve housing;
   said valve plate being rotatable about its said axis between a first position in which the fluid is supplied from said first of at least one of said valve housing passages to one of the passages through the valve plate, and from another of the passages through the valve plate to said second of at least one of said valve housing passages communicating with the discharge from said valve housing, and a second position in which the fluid is supplied from another of said valve housing passages to another of the passages through-the valve plate, and from another of the passages through the valve plate to said third of at least one of said valve housing passages communicating with the drain from said valve housing, and
   said valve plate is also rotatable to at least one or more additional positions which include a rinse position in which fluid passes from the fluid supply and thereafter to the drain, or a bypass position in which fluid passes from the fluid supply through the valve plate and to a fluid discharge from the valve housing.

2. The unit of claim 1, wherein said faces are substantially planar and parallel to each other, and the axis of the plate is substantially perpendicular to the planar faces.

3. The unit of claim 2, including a plurality of seals on at least one of the faces which are selectively alignable with ones of the passages which open through the other of the faces when the other of the faces is rotated relative to at least one of said faces as said valve plate is rotated.

4. The unit of claim 3, wherein said seals comprise O-rings.

5. The unit of claim 3, wherein said seals comprise spring loaded gaskets.

6. The unit of claim 1, including a plurality of seals on at least one of said faces which are selectively alignable with ones of the passages which open through the other of said faces when the other of said faces is rotated relative to said at least one of said faces as said valve plate is rotated.

7. The unit of claim 6, wherein said seals comprise O-rings.

8. The unit of claim 6, wherein said seals comprise spring loaded gaskets.

9. The unit of claim 1, wherein the unit also includes in combination with the rotatable valve, a housing containing at least one fluid treatment medium; and wherein when said valve plate is in said first position, the fluid is supplied from the first passage from the fluid supply in the valve housing to one of the passages through the valve plate and to the fluid treatment medium, and from said fluid treatment medium to another of the passages through the valve plate to said second passage in said valve housing communicating with the discharge from said valve housing to provide fluid which has been treated by said fluid treatment medium through said discharge, and said second position in which the fluid is supplied from another of said passages in the valve housing to another of the passages through the valve plate and to said fluid treatment medium, and from said fluid treatment medium to another of the passages through the valve plate and to said third passage in the valve housing communicating with the drain from said valve housing to backwash the fluid treatment medium.

10. The unit of claim 1, wherein said valve plate also is rotatable to an off position in which fluid flow through the unit is turned off.

11. The unit of claim 9, wherein when said valve plate is in said second position, fluid is supplied from the fluid supply to said fluid treatment medium to backwash said fluid treatment medium.

12. The unit of claim 9, wherein said valve housing includes a passage for communication with a source of brine for regeneration of the fluid treatment medium, and when said valve plate is in the second position, fluid is supplied from the source of brine through the last mentioned passage to said fluid treatment medium to regenerate the fluid treatment medium.

13. The unit of claim 9, wherein said housing in which the medium is contained is fixed to said valve plate, whereby said valve plate is rotated between said positions by rotation of the housing.

14. The unit of claim 13, wherein when said valve plate is in said second position, fluid is supplied from the fluid supply to said fluid treatment medium to backwash said fluid treatment medium.

15. The unit of claim 13, wherein said valve housing includes a passage for communication with a source of brine for regeneration of the fluid treatment medium, and when said valve plate is in said second position, fluid is supplied from the source of brine through the last mentioned passage to said fluid treatment medium to regenerate said fluid treatment medium.

16. The unit of claim 9, wherein when said valve plate is rotated to said rinse position fluid passes from the fluid supply through the fluid treatment medium to rinse it and therefrom to said drain, and when said valve plate is rotated to said bypass position fluid is bypassed around the fluid treatment medium from the fluid supply through the valve plate and to said fluid discharge from the valve housing.

17. The unit of claim 16, wherein said valve plate also is rotatable to an off position in which fluid flow through the unit is turned off.

18. A unit including a rotatable valve comprising;

a substantially disc shaped valve plate, a face on one side of the disc shaped valve plate having openings in said face, and a plurality of passages extending into said plate from said openings in said face, with at least some of said passages extending through the thickness of said valve plate to communicate with the side of said plate opposite the face, said disc shaped valve plate being rotatable about an axis which extends at a substantial angle to said face;

a valve housing having a face adjacent said valve plate face, said valve housing also having a plurality of passages therein and opening to said valve housing face, first of at least one of said valve housing passages communicating with a supply of fluid, second of at least one of said valve housing passages communicating with a discharge for said fluid from said valve housing, and third of at least one of said valve housing passages communicating with a drain from said valve housing; and a plurality of first and second seals on at least one of said faces, said first seals being selectively alignable with ones of the passages which open through the other of said faces when the other of said faces is rotated relative to said at least one of said faces as said valve plate is rotated, and said second seals being blind seals which block the flow through selective ones of said passages as said valve plate is rotated;

said valve plate being rotatable about its said axis between a first position in which the fluid is supplied from said first of at least one of said valve housing passages to one of the passages through the valve plate, and from another of the passages through the valve plate to said second of at least one of said valve housing passages communicating with the discharge from said valve housing, and a second position in which the fluid is supplied from another of said valve housing passages to another of the passages through the valve plate, and from another of the passages through the valve plate to said third of at least one of said passages communicating with the drain from said valve housing.

19. The unit of claim 18, wherein said seals comprise O-rings.

20. The unit of claim 18, wherein said seals comprise spring loaded gaskets.

21. The unit of claim 18, wherein said faces are substantially planar and parallel to each other, and the axis of the plate is substantially perpendicular to the planar faces.

22. The unit of claim 18, wherein the unit also includes in combination with the rotatable valve, a housing containing at least one fluid treatment medium; and wherein when said valve plate is in said first position, the fluid is supplied from the first passage from the fluid supply in the valve housing to one of the passages through the valve plate and to the fluid treatment medium, and from said fluid treatment medium to another of the passages through the valve plate to said second passage in said valve housing communicating with the discharge from said valve housing to provide fluid which has been treated by said fluid treatment medium through said discharge, and said second position in which the fluid is supplied from another of said passages in the valve housing to another of the passages through the valve plate and to said fluid treatment medium, and from said fluid treatment medium to another of the passages through the valve plate and to said third passage in the valve housing communicating with the drain from said valve housing to backwash the fluid treatment medium.

23. The unit of claim 22, wherein said valve plate is also rotatable to at least one or more additional positions which include a rinse position in which fluid passes from the fluid supply through the fluid treatment medium to rinse it and therefrom to the drain, an off position in which fluid flow through the unit is turned off or a bypass position in which fluid is bypassed around the fluid treatment medium from the fluid supply through the valve plate and to a fluid discharge from, the valve housing.

24. The unit of claim 22, wherein when said valve plate is in said second position, fluid is supplied from the fluid supply to said fluid treatment medium to backwash said fluid treatment medium.

25. The unit of claim 22, wherein said valve housing includes a passage for communication with a source of brine for regeneration of the fluid treatment medium, and when said valve plate is in the second position, fluid is supplied from the source of brine through the last mentioned passage to said fluid treatment medium to regenerate the fluid treatment medium.

26. The unit of claim 22, wherein said housing in which the medium is contained is fixed to said valve plate, whereby said valve plate is rotated between the first and second positions by rotation of the housing.

27. The unit of claim 26, wherein said valve plate is also rotatable by the rotation of said housing to at least one or more additional positions which include a rinse position in which fluid passes from the fluid supply through the fluid treatment medium to rinse it and therefrom to the drain, an off position in which fluid flow through the unit is turned off or a bypass position in which fluid is bypassed around the fluid treatment medium from the fluid supply through the valve plate and to a fluid discharge from the valve housing.

28. The unit of claim 26, wherein when said valve plate is in said second position, fluid is supplied from the fluid supply to said fluid treatment medium to backwash said fluid treatment medium.

29. The unit of claim 26, wherein said valve housing includes a passage for communication with a source of brine for regeneration of the fluid treatment medium, and when said valve plate is in said second position, fluid is supplied from the source of brine through the last mentioned passage to said fluid treatment medium to regenerate said fluid treatment medium.

* * * * *